Oct. 11, 1960

R. G. MINER 2,955,436

REFRIGERATION APPARATUS WITH REMOTE READJUSTABLE
LOAD LIMIT CONTROL

Filed Dec. 6, 1957

INVENTOR.
ROBERT G. MINER

BY Holmes + Andersen

ATTORNEYS

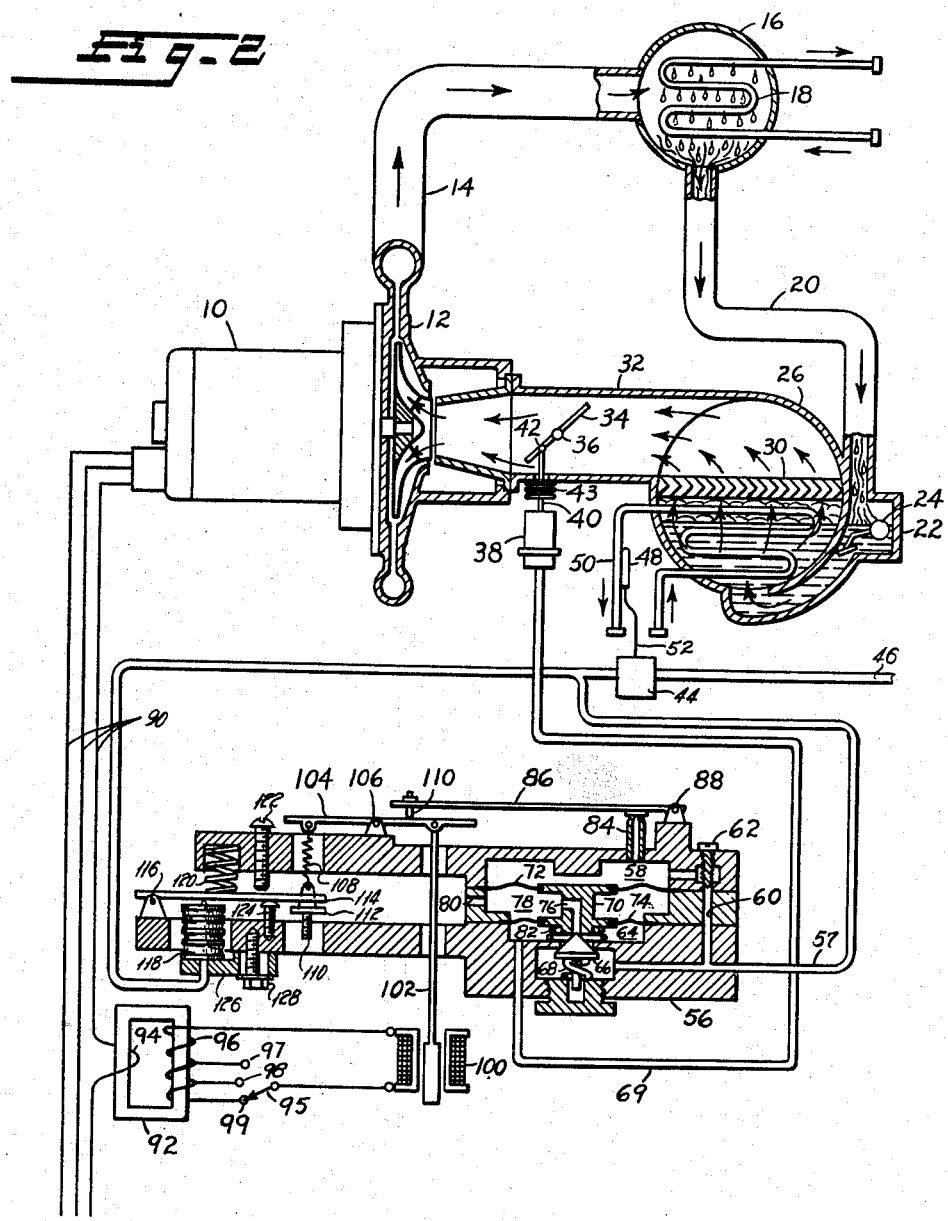

United States Patent Office 2,955,436
Patented Oct. 11, 1960

2,955,436

REFRIGERATION APPARATUS WITH REMOTE READJUSTABLE LOAD LIMIT CONTROL

Robert G. Miner, La Crosse, Wis.

Filed Dec. 6, 1957, Ser. No. 701,200

6 Claims. (Cl. 62—211)

This invention relates to refrigeration apparatus having control means for operating the apparatus at a capacity which corresponds with the refrigeration load on the apparatus and limiting the capacity of the compressor of the refrigeration apparatus to prevent exceeding a maximum safe current through the driving motor of the compressor.

Refrigeration apparatus is controlled to maintain a desired temperature of refrigerant supplied to the refrigeration load. There are several conditions under which the motor will tend to draw a current of a magnitude such that the motor will be damaged. When refrigeration apparatus is started after it has been at rest for a period of time, the suction pressure is substantially equal to the saturation pressure of the refrigerant at the ambient temperature. This pressure is higher than the normal suction pressure with the result that the flow rate through the compressor is considerably increased. A high flow rate through the compressor will put a high load on the motor and the motor will draw a current which will damage the motor.

Low voltage to the motor is another condition which will cause the motor to draw an excessive current. Various other conditions may cause the motor to draw an excessive current.

The device of this invention provides means for measuring the value of the electric current through the driving motor of the compressor and uses this measurement to control the flow of gas to the compressor to maintain a substantially constant motor current regardless of variations in condensing temperature.

The device of this invention provides means for limiting the load to 100% of full load capacity or some increment of full load capacity such as 60% or 40%. When it is known that the load will be less than full load for a given period, the load limit device may be set at the desired reduced capacity in order to avoid paying the supplier of electrical energy a demand charge on a higher capacity which might be desired only for a few hours during the period.

My copending application Serial No. 540,907 filed October 17, 1955, and entitled "Refrigeration Apparatus with Load Limit Control" and which issued as Patent No. 2,817,213 on December 24, 1957, accomplishes these results and is entirely satisfactory when the condensing pressure is substantially constant. For a given opening of the inlet vane or vanes, the compressor operates at considerably greater output when the condensing temperature is considerably below design temperature than it does when the compressor is operating at design condensing temperature. Thus a system wherein a temperature controller is used to actuate the inlet vanes to control the capacity of the compressor may be set to have a throttling range of 10° at design condensing temperature, but it will have a throttling range of only a few degrees when the condensing water is considerably below design temperature and the machine delivers full output with the inlet vane or vanes only slightly open.

If the system is stable when the throttling range is 10°, it is apt to become unstable when the throttling range is reduced to only a few degrees. As a result it is necessary to set the throttling range of the instrument sufficiently wide so that stable operation will be had under conditions of low condensing water temperature where the response of the machine to changes in control pressure is the greatest.

When the design condensing temperature is experienced the throttling range will be undesirably wide and the chilled water temperature will vary quite substantially with changes in load.

It is an object of this invention to provide a control system in which a load limit device controls the inlet vanes directly to maintain a constant motor current and comparable nearly constant tonnage output regardless of the condensing temperature, and a chilled water thermostat pneumatically resets the value of current at which the load limit device controls.

Other objects and advantages of the invention will become apparent as the specification proceeds to describe the invention with reference to the accompanying drawings in which the apparatus is shown diagrammatically.

Fig. 2 is a diagrammatic view of a modification of the control system in which the load limit relay receives its air supply from the output of the chilled water thermostat.

Figure 1:
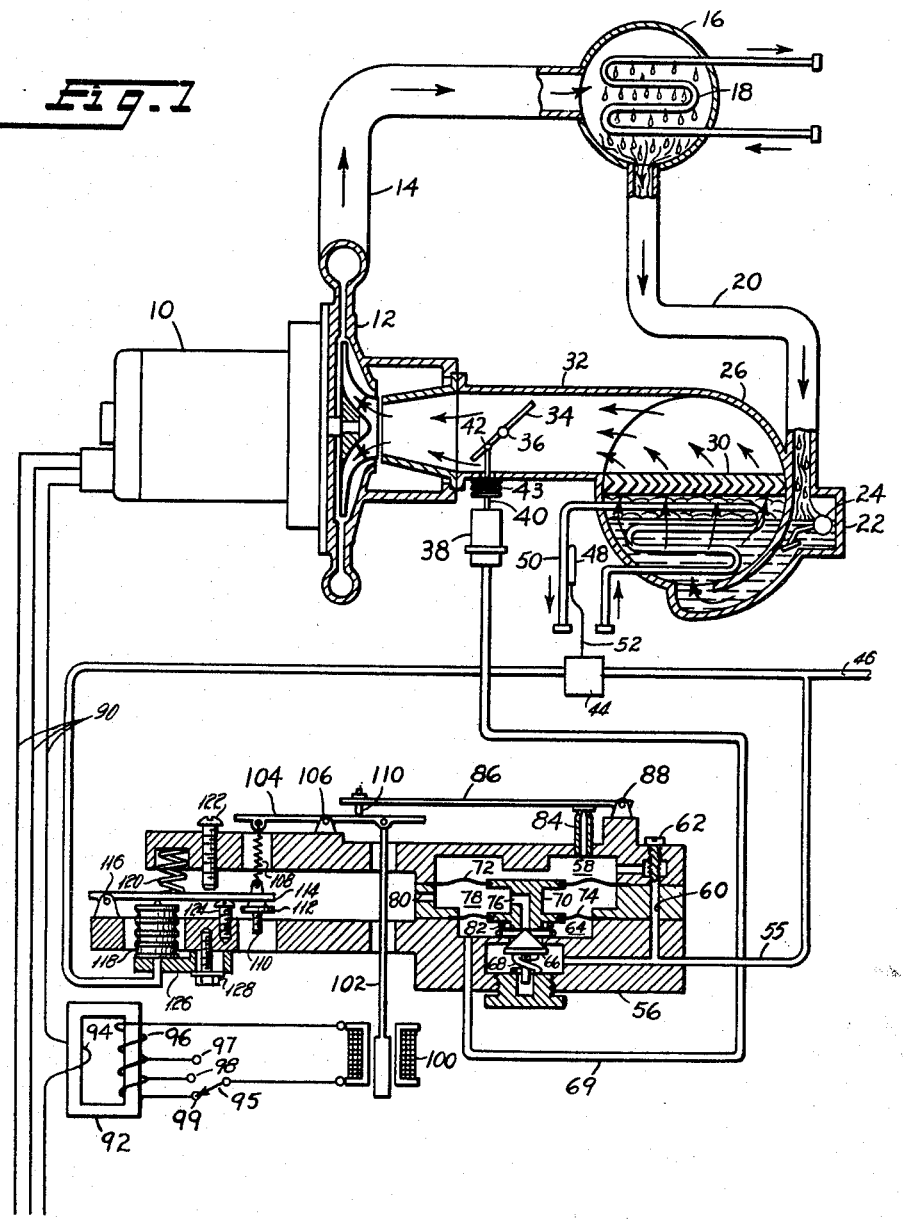
Fig. 1 is a diagrammatic view of the control system having a load limit relay with remote readjustment responsive to the evaporator temperature.

An electric motor 10 is connected to and drives a compressor 12. The compressor 12 discharges the refrigerant gas into a pipe 14 which conducts the gas to a condenser 16. The condenser is preferably of the shell and tube type in which cooling water flows through the tubes 18 and the refrigerant is in the shell outside the tubes. Refrigerant liquid condensed in condenser 16 flows by gravity through pipe 20 to a float chamber 22. Float 24 in float chamber 22 opens and closes to control the flow of refrigerant liquid to an evaporator 26 which is preferably of the shell and tube type in which a secondary refrigerant liquid such as water or brine flows through the tubes 28. In removing heat from the secondary refrigerant, the refrigerant in the evaporator 26 boils forming gas which passes through the liquid eliminator 30 and thence into the suction pipe 32 to the compressor 12.

A damper 34 is pivotally mounted at 36 in the suction pipe 32. Damper 34 may be pivoted from a position in which it is in axial plane of pipe 32 to various angular positions to reduce the flow of gas to the compressor 12. It should be understood that means other than the damper shown may be used to vary the flow to the compressor. For instance, inlet vanes as shown in the patent to Hagen, No. 1,989,413 can be used to vary the flow through the compressor. The rate of flow of gas through the compressor is one of the factors which determines the power required by the compressor and thus the current required by the motor. Therefore, the position of the damper 34 determines the current drawn by the motor 10. A pneumatic motor 38 has a rod 40 pivotally connected to the vane 34 at 42. A bellows 43 provides a seal between the rod 40 and the pipe 32. The bellows 43 is flexible to permit movement of the rod 40. The pneumatic motor 38 is of well known construction in which a piston or diaphragm translates pressures into rod positions.

A pneumatic thermostat 44 is connected to receive air under pressure from a source 46. Thermostat 44 has a temperature sensing bulb 48 thermally responsive to the temperature of the fluid in the pipe 50 which conducts the secondary refrigerant to the refrigeration load. If desired, the bulb 48 may be immersed in the refrigerant flowing in pipe 50. The bulb 48 is connected to the thermostat 44 by a tube 52.

The pneumatic thermostat 44 is of a well known type which sends out through tube 54, air having a pressure directly proportional to the temperature of the refrigerant in pipe 50. Tube 55 is connected to a load limit relay 56. An upper chamber 58 receives air from source 46 through passageway 60. A needle valve 62 can be adjusted to obtain the desired restricted flow to upper chamber 58. A lower chamber 64 receives air from source 46 and a conical valve 66 controls the flow of air into lower chamber 64. A spring 68 acts to hold conical valve 66 in closed position. Lower chamber 64 is connected to pneumatic motor 38 by tube 69. A spool member 70 is secured at one end to diaphragm 72 and at its other end to diaphragm 74. Diaphragm 72 has approximately twice the area of diaphragm 74. Spool member 70 has a passageway 76 leading to chamber 78 which is open to the atmosphere through hole 80. A spring 82 acts to raise spool member 70 from contact with conical valve 66. A bleed port 84 permits air to escape from upper chamber 58 under certain conditions to be described later. A lever 86 pivoted at 88 opens and closes the bleed port 84 to control the flow of air therethrough.

The motor 10 has three leads 90 connected to a source of electrical energy. A current transformer 92 has its primary winding 94 in one of the leads 90. The secondary winding 96 has three taps 97, 98, and 99 for 40%, 60% and 100% of maximum safe motor current. Taps 97, 98, and 99 may be selectively contacted by switch blade 95. The secondary winding 96 is connected to a solenoid 100 which has a plunger 102 which acts against a lever 104 pivoted at 106. A spring 108 substantially counteracts the weight of plunger 102. Lever 104 acts against lever 86 at 110 to raise the lever 86 to uncover the bleed port 84. The current transformer 92 has a suitable ratio of primary current to secondary current so that the current to solenoid 100 is approximately five amperes.

Secured to the end of spring 108 is a threaded stem 110 on which is threadedly mounted an abutment 112 which engages a lever 114 pivoted at 116. A bellows 118 supplied with air pressure through line 54 acts on lever 114 and is opposed by a spring 120 also acting on lever 114 in the opposite direction. The bellows 118 and the spring 120 as a combination are linearly responsive to the air pressure output from the pneumatic thermostat 44 and move the lever 114 between threadedly adjustable stops 122 and 124. The bellows 118 is mounted on a bracket 126 which may be adjusted to vary the lever arm at which the bellows 118 acts. This adjustment is made by first loosening the screw 128, then moving the bracket 126 to the desired position and finally tightening the screw 128 to hold the bracket 126 in adjusted position.

It is thus seen that the action of the bellows 118 acting through lever 114 adjusts the initial tension of the spring 108 of the load limit relay 56. The screw 112 is adjusted so that when no air pressure is applied to the bellows 118, it just counterbalances the pull of the solenoid 100 when the motor is operating at "no load" current, and the pneumatic portion of the load limit relay 56 will hold the vanes 34 in substantially closed position so that the compressor 12 operates at minimum output.

Having described the apparatus, its method of operation will now be explained.

As the water temperature rises indicating an increase in refrigerating load, the air pressure from the pneumatic thermostat 44 will increase and through the action of bellows 118 reduce the tension on spring 108 causing the load limit relay 56 to transmit a higher pressure to motor 38. A higher pressure in motor 38 controls the vane 34 to operate at a higher compressor output and higher motor current and thus an equilibrium will be reached where the inlet vane or vanes allow the compressor to load the motor correspondingly. A further rise in temperature will result in a further increase in control air pressure and further motion of the bellows 118 until the lever 114 abuts the stop 122 at which point the tension of spring 108 will be such that the compressor operates at its maximum output.

The operation of the relay 56 will now be described. A diaphragm 72 has an area substantially twice as great as that of diaphragm 74 and therefore, the force downward on the spool member 70 is sufficient to compress springs 82 and 68 to close passageway 76 and to move conical valve 66 to open position. The pressure in chamber 64 is therefore substantially the pressure of the source 46 and this pressure is transmitted through tube 69 to the pneumatic motor 38. It is thus seen that air pressure will be transmitted to the pneumatic motor 38 to move the vane 34 toward the open position. As the load increases so that the motor tends to draw increasing current, the solenoid 100 moves plunger 102 upwardly and through levers 104 and 86 opens bleed port 84. Opening of bleed port 84 reduces the pressure in chamber 58 to close conical valve 66 and open passageway 76. The pressure in chamber 64 is thus reduced below the pressure of source 46 and pneumatic motor 38 receives this reduced pressure. A reduction in pressure in pneumatic motor 38 moves damper 34 to reduce the flow to the compressor 12. The current transformer 92 and the solenoid 100 by controlling the bleed port 84 operates the compressor at a capacity at which the motor current as measured by the solenoid 100 balances the weight of the plunger 102 and the opposing action of the spring 108.

The ratio between the pressure in chamber 58 and in chamber 64 is closely maintained as the pressure is reduced in chamber 58 by the opening of the bleed port 84 increasing amounts. Cone valve 66 admits air to or exhausts air from chamber 64 to always balance the forces on the diaphragms 72 and 74. Thus the air pressure to the pneumatic motor 38 is proportional to the motor current within the range of the load limit relay as determined by the tension of the spring 108 which is in turn set by the action of the air pressure from the thermostat 44 on the bellows 118.

The switch blade 95 may be put in contact with taps 97 or 98 to limit the flow to the compressor so that the current to the motor is limited to some percentage of the full load current such as 40% or 60%. The supplier of electrical energy makes a demand charge based on the maximum current drawn during a given period. Often this maximum current is called for only during a relatively short period. When conditions are such that the load on the refrigeration machine is low most of the time, the blade 95 may be put in contact with tap 98 to limit the apparatus to operation at 60% of full load current. The demand charge will be based on 60% full load current. The refrigeration thus produced might fail to equal the heat load on the apparatus for a short period, but the large mass of refrigerant will prevent the temperature from rising seriously during this short period.

Fig. 2 shows a modification of the invention which operates in a similar manner to the system of Fig. 1 except that the relay 56 receives its supply pressure through a line 57 connected to the output side of the thermostat 44. This supply pressure is therefore reduced as the temperature of the chilled water falls and the amount that the vane 34 can be opened is limited according to the temperature of the chilled water. This provides safety against freezing the chilled water in the event that any portion of the reset mechanism or the control mechanism of the load limit relay fail.

Although I have described specifically the preferred embodiments of my invention, I contemplate that changes may be made without departing from the scope or spirit of my invention and I desire to be limited only by the claims.

I claim:

1. Refrigeration apparatus comprising a condenser, an evaporator, a compressor connected to draw refrigerant from said evaporator and discharge the refrigerant into said condenser, an electric motor for driving said compressor, positionable means for throttling the flow of gas to said compressor, adjustable control means for positioning said positionable throttling means in response to the magnitude of electrical energy drawn by said electric motor and means responsive to the temperature of said evaporator for readjusting said adjustable control means to change the relationship between the position of said positionable throttling means and the magnitude of electrical energy drawn by said electric motor.

2. Refrigeration apparatus comprising a condenser, an evaporator, a compressor connected to draw refrigerant from said evaporator and discharge the refrigerant into said condenser, an electric motor for driving said compressor, positionable means for variably throttling the flow of gas to said compressor, first adjustable fluid actuated control means responsive to the magnitude of electrical energy drawn by said electric motor for positioning said positionable throttling means, and second fluid actuated control means responsive to the temperature of said evaporator for readjusting said first adjustable fluid actuated control means to change the relationship between the position of said positionable throttling means and the magnitude of electrical energy drawn by said electric motor.

3. Refrigeration apparatus comprising a condenser, an evaporator, a compressor connected to draw refrigerant from said evaporator and discharge the refrigerant into said condenser, an electric motor for driving said compressor, means for throttling the flow of gas to said compressor, a fluid motor for positioning said throttling means, first fluid actuated control means responsive to the magnitude of electrical energy drawn by said electric motor for transmitting to said fluid motor fluid pressure having a proportional relationship to said magnitude of electrical energy and second fluid actuated control means responsive to the temperature of said evaporator for loading said first fluid actuated control means to change the proportional relationship between the fluid pressure transmitted to said fluid motor and said magnitude of electrical energy drawn by said electric motor.

4. Refrigeration apparatus comprising a condenser, an evaporator, a compressor connected to draw refrigerant from said evaporator and discharge the refrigerant into said condenser, an electric motor for driving said compressor, adjustable throttling means for throttling the flow of gas to said compressor to vary the load on said compressor, a fluid motor for positioning said adjustable throttling means, first fluid means in fluid communication with said fluid motor and adapted to be connected to a source of fluid under pressure, said first fluid means being responsive to the magnitude of electrical energy drawn by said electric motor for transmitting to said fluid motor fluid pressure having a proportional relationship to the magnitude of electrical energy drawn by said electric motor, a fluid thermostat responsive to the temperature of said evaporator and second fluid means responsive to said fluid thermostat for loading said first fluid means to change the proportional relationship between the magnitude of electrical energy drawn by said motor and the pressure transmitted by said first fluid means to said fluid motor.

5. Refrigeration apparatus comprising a condenser, an evaporator, a compressor connected to draw refrigerant from said evaporator and discharge the refrigerant into said condenser, an electric motor for driving said compressor, adjustable means for throttling the flow of gas to said compressor, a fluid motor for positioning said adjustable throttling means, a fluid thermostat responsive to the temperature of said evaporator, an adjustable fluid relay adapted to be connected to a source of fluid pressure, said fluid relay having means to transmit fluid pressure to said fluid motor, means responsive to the magnitude of the electrical energy drawn by said electric motor for controlling said fluid relay to vary the pressure transmitted from said fluid relay to said fluid motor and means responsive to said fluid thermostat for readjusting the control point of said fluid relay to change the relationship between the position of said adjustable throttling means and the magnitude of electrical energy drawn by said electric motor.

6. Refrigeration apparatus comprising a condenser, an evaporator, a compressor connected to draw refrigerant from said evaporator and discharge the refrigerant into said condenser, an electric motor for driving said compressor, adjustable means for throttling the flow of gas to said compressor, a fluid motor for positioning said adjustable throttling means, a fluid thermostat responsive to the temperature of said evaporator, an adjustable fluid relay connected to receive fluid from said fluid thermostat and to transmit fluid pressure to said fluid motor, magnetic means for controlling said adjustable fluid relay to vary the pressure transmitted from said fluid thermostat to said fluid motor, means for energizing said magnetic means in proportion to the magnitude of electrical energy drawn by said electric motor, means for adjusting said energizing means to increase the energization of said magnetic means and means responsive to said fluid thermostat for readjusting the control point of said adjustable fluid relay to change the relationship between the position of said adjustable throttling means and the magnitude of electrical energy drawn by said electric motor.

References Cited in the file of this patent

UNITED STATES PATENTS

| | | |
|---|---|---|
| 2,046,894 | Cander | July 7, 1936 |
| 2,169,554 | Buchanan | Aug. 15, 1939 |
| 2,581,956 | Jones | Jan. 8, 1952 |
| 2,817,213 | Miner | Dec. 24, 1957 |